United States Patent
Lee

(10) Patent No.: US 6,924,052 B2
(45) Date of Patent: Aug. 2, 2005

(54) COOLANT FLOW FIELD DESIGN FOR FUEL CELL STACKS

(75) Inventor: James H. Lee, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 389 days.

(21) Appl. No.: 10/131,128

(22) Filed: Apr. 24, 2002

(65) Prior Publication Data

US 2003/0203260 A1 Oct. 30, 2003

(51) Int. Cl.⁷ ............................. H01M 8/04; H01M 8/10
(52) U.S. Cl. ............................. 429/26; 429/24; 429/34; 429/120
(58) Field of Search ............................. 429/24, 26, 34, 429/120

(56) References Cited

U.S. PATENT DOCUMENTS

| 5,624,769 | A |  | 4/1997 | Li et al. |
| 5,663,113 | A |  | 9/1997 | Midorikawa et al. |
| 5,707,755 | A |  | 1/1998 | Grot |
| 5,776,624 | A |  | 7/1998 | Neutzler |
| 6,099,984 | A |  | 8/2000 | Rock |
| 6,146,779 | A | * | 11/2000 | Van Cleemput ............. 429/26 |
| 6,159,626 | A |  | 12/2000 | Keskula et al. |
| 6,186,254 | B1 |  | 2/2001 | Mufford et al. |
| RE37,284 | E |  | 7/2001 | Li et al. |
| 6,261,710 | B1 | * | 7/2001 | Marianowski ............... 429/34 |
| 6,309,773 | B1 | * | 10/2001 | Rock ........................... 429/34 |
| 6,358,642 | B1 |  | 3/2002 | Griffith et al. |
| 6,372,376 | B1 |  | 4/2002 | Fronk et al. |
| 6,376,112 | B1 |  | 4/2002 | Clingerman et al. |

FOREIGN PATENT DOCUMENTS

FR        2810795 A1    12/2001

OTHER PUBLICATIONS

Notification of Transmittal Of The International Search Report Or The Declaration, dated Aug. 8, 2003.

* cited by examiner

Primary Examiner—Carol Chaney
(74) Attorney, Agent, or Firm—Harness, Dickey & Pierce, P.L.C.

(57) ABSTRACT

A bipolar plate assembly is provided for use in a fuel cell stack to supply reactants to the anode and cathode sides of fuel cells within the stack. The bipolar plate assembly includes first and second sub-plates, each including a first face surface having a coolant flow field formed therein and a second face surface having a reactant flow field formed therein. The coolant fields of the first and second sub-plates include regions of varying flow volume, having respective flow resistance therebetween. The regions of varying flow volume enable variable cooling across the fuel cell stack, thereby enabling a constant temperature to be achieved across the fuel cell stack.

25 Claims, 5 Drawing Sheets

COOLANT FLOW FIELD DESIGN FOR FUEL CELL STACKS

FIELD OF THE INVENTION

This invention relates generally to PEM fuel cells and more particularly to bipolar plates for separating adjacent fuel cells in a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) pass electrons from the anode of one fuel cell to the cathode of the adjacent cell of a fuel cell stack, (2) contain appropriate channels and/or openings formed therein for distributing the fuel cell's gaseous reactants over the surfaces of the respective anode and cathode catalysts; and (3) contain appropriate channels and/or openings formed therein for distributing appropriate coolant throughout the fuel cell stack in order to maintain temperature.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster. By way of example, some typical arrangements for multiple cells in a stack are shown and described in U.S. Pat. No. 5,663,113.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$).

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

In a fuel cell stack, a plurality of cells are stacked together in electrical series while being separated by a gas impermeable, electrically conductive bipolar plate. In some instances, the bipolar plate is an assembly formed by securing a pair of thin metal sheets having reactant flow fields formed on their external face surfaces. Typically, an internal coolant flow field is provided between the metal plates of the bipolar plate assembly. It is also known to locate a spacer plate between the metal plates to optimize the heat transfer characteristics for improved fuel cell cooling. Various examples of a bipolar plate assembly of the type used in PEM fuel cells are shown and described in commonly-owned U.S. Pat. No. 5,766,624.

Typically, the cooling system associated with a fuel cell stack includes a circulation pump for circulating a liquid coolant through the fuel cell stack to a heat exchanger where the waste thermal energy (i.e., heat) is transferred to the environment. The thermal properties of typical liquid coolants require that a relatively large volume be circulated through the system to reject sufficient waste energy in order to maintain the temperature of the stack within an acceptable range, particularly under maximum power conditions. To this end, it is desirable to maintain a constant operating temperature across the entire length of each fuel cell to improve the operating efficiency of the fuel cell stack and the durability of its components. However, most bipolar plates (and monopolar end plates) have a coolant flow field configured to provide a consistent rate of coolant flow across the entire plate assembly, thereby over-cooling some areas of the fuel cell while under-cooling other areas. Preferably, more cooling is required in the central portion of the fuel cell's active area since radiant and convective heat transfer occurs at the perimeter of the stack.

Therefore, it is desirable in the industry to provide a mechanism for providing uniform total cooling across the entirety of the fuel cell stack. In this manner, a constant homogeneous operating temperature for the fuel stack can be achieved, thereby improving the efficiency and durability of the fuel stack.

SUMMARY OF THE INVENTION

Accordingly, the present invention provides a plate assembly for channeling coolant through a PEM fuel cell. The plate assembly includes a plate having a first side defining a reactant flow field and a second side defining a coolant flow field. The coolant flow field is divided into several distinct flow regions including an entry supply region in fluid communication with a first diffusion region, an exit exhaust region in fluid communication with a second diffusion region, a low resistance region interconnecting the first and second diffusion regions for providing fluid communication therebetween, and a high resistance region interconnecting the first and second diffusion regions for providing fluid communication therebetween. The volume of coolant flowing through the low resistance region differs from the volume of coolant flowing through the high resistance region, thereby providing a variance in the cooling rate across the plate assembly.

The present invention enables temperature uniformity to be achieved across the fuel cell stack, thereby enabling optimization of the reaction over the entire active area which, by definition, increases the efficiency of the fuel cell stack.

The present invention also enables a reduction in the amount of energy required to control the fuel cell stack temperature by reducing the required pumping power, thereby further increasing overall system efficiency and reducing cost.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
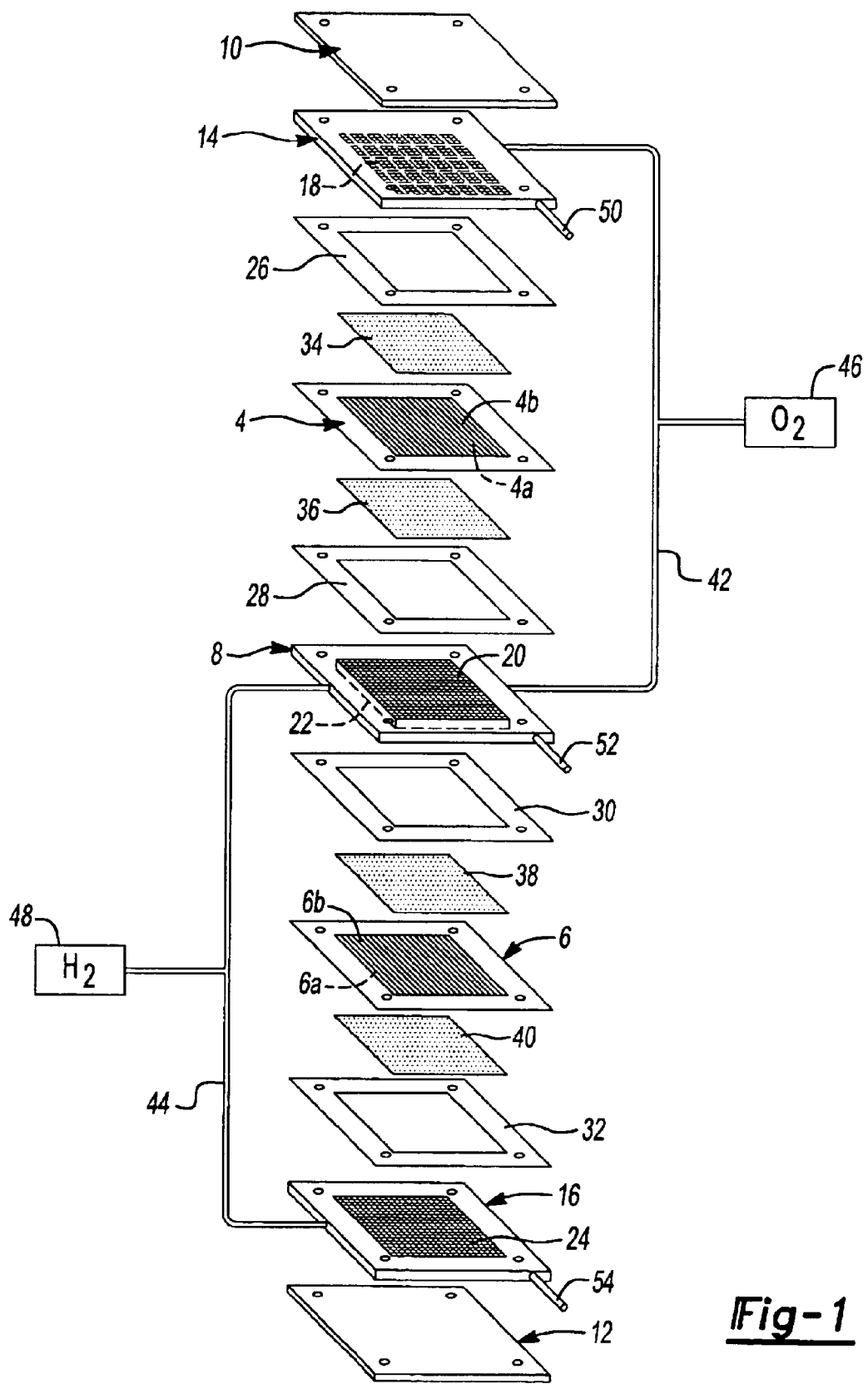
FIG. 1 is an exploded isometric view of a PEM fuel stack.

Before further describing the invention, it is useful to understand an exemplary fuel cell system within which the invention operates. Specifically, FIG. 1 schematically depicts a PEM fuel cell stack having a pair of membrane-electrode assemblies (MEAs) 4 and 6 separated from each other by a non-porous, electrically-conductive, liquid-cooled bipolar plate assembly 8. Each MEA 4 and 6 has a corresponding cathode face 4a, 6a and an anode face 4b and 6b. MEAs 4 and 6 and bipolar plate assembly 8 are stacked together between non-porous, electrically-conductive, liquid-cooled monopolar end plate assembly 14 and 16. Steel clamping plates 10 and 12 are provided for enclosing the exemplary fuel cell stack. Connectors (not shown) are attached to clamping plates 10 and 12 to provide positive and negative terminals for the fuel cell stack. Bipolar plate assembly 8 and end plate assemblies 14 and 16 include corresponding flow fields 20, 22, 18 and 24, each having a plurality of flow channels formed in the faces thereof for distributing fuel and oxidant gases (i.e., $H_2$ and $O_2$) to the reactive faces of MEAs 4 and 6. Nonconductive gaskets or seals 26, 28, 30, and 32 provide a seal and electrical insulation between the several plates of the fuel cell stack.

With continued reference to FIG. 1, porous, gas permeable, electrically conductive sheets 34, 36, 38 and 40 are shown to be pressed up against the electrode faces of MEAs 4 and 6 and serve as primary current collectors for the electrodes. Primary current collectors 34, 36, 38 and 40 also provide mechanical supports for MEAs 4 and 6, especially at locations where the MEAs are otherwise unsupported in the flow fields. Suitable primary current collectors include carbon/graphite paper/cloth, fine mesh noble metal screens, open cell noble metal foams, and the like which conduct current from the electrodes while allowing gas to pass therethrough.

End plates 14 and 16 press up against primary current collector 34 on cathode face 4b of MEA 4 and primary current collector 40 on anode face 6a of MEA 6 while bipolar plate assembly 8 presses up against primary current collector 36 on anode face 4a of MEA 4 and against primary current collector 38 on cathode face 6b of MEA 6. An oxidant gas, such as oxygen or air, is supplied to the cathode side of the fuel cell stack from a storage tank 46 via appropriate supply plumbing 42. Similarly, a fuel, such as hydrogen, is supplied to the anode side of the fuel cell from a storage tank 48 via appropriate supply plumbing 44. In a preferred embodiment, oxygen tank 46 may be eliminated, such that ambient air is supplied to the cathode side from the environment. Likewise, hydrogen tank 48 may be eliminated and hydrogen supplied to the anode side from a reformer which catalytically generates hydrogen from methanol or a liquid hydrocarbon (e.g., gasoline). While not shown, exhaust plumbing for both the $H_2$ and $O_2$/air sides of MEAs 4 and 6 is also provided for removing $H_2$-depleted anode gas from the anode reactant flow field and $O_2$-depleted cathode gas from the cathode reactant flow field. Coolant supply plumbing 50, 52, and 54 is provided for supplying a liquid coolant from an inlet header (not shown) of the fuel cell stack to the coolant flow fields of bipolar plate assembly 8 and end plates 14 and 16. While not shown, coolant exhaust plumbing is provided for delivering the heated coolant discharged from bipolar plate assembly 8 and end plates 14 and 16 to an exhaust header of the fuel cell stack. As is conventional, a fuel cell cooling system is connected between the stack's inlet and exhaust headers which is operable to continuously circulate the liquid coolant and remove waste heat from the stack for rejection to the environment.

The fuel cell shown is fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels, such as methanol, ethanol, gasoline, alkene, or other aliphatic or aromatic hydrocarbons, or from fuel stored on board, such as $H_2$.

Figure 2:
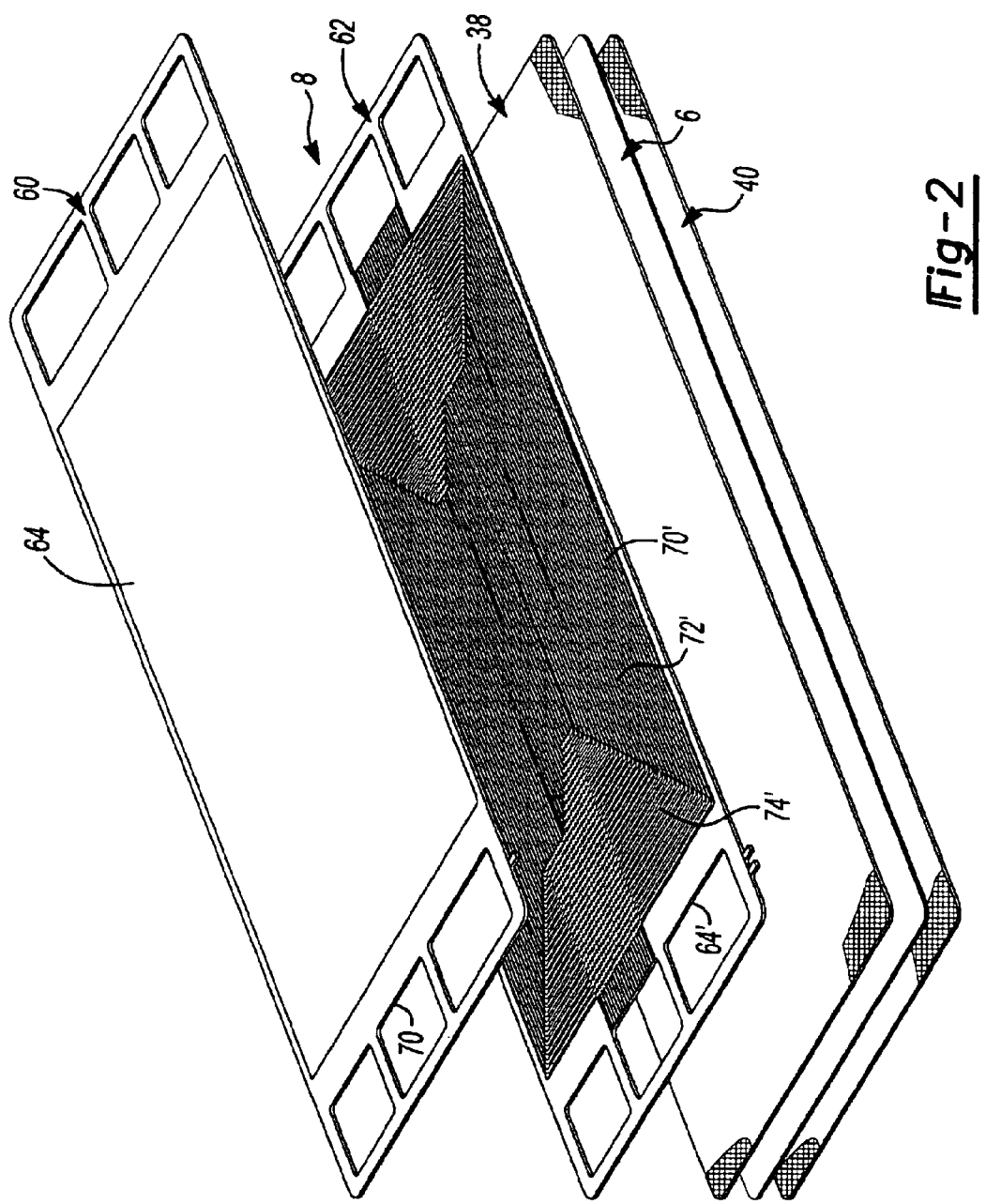
FIG. 2 is an isometric exploded view of an MEA and bipolar plate assembly associated with the PEM fuel cell stack shown in FIG. 1.

FIG. 2 depicts an exploded view of the bipolar plate assembly 8, primary current collector 38, MEA 6 and primary current collector 40 arranged in a stacked relationship in a fuel cell. End plate assembly 16 would underlie second primary collector 40 (as shown in FIG. 1) to form a fuel cell. Another set of primary current collectors 34 and 36, MEA 4 and end plate assembly 14 would overlie bipolar plate assembly 8 (as shown in FIG. 1) to form another fuel cell. As will be detailed, the present invention is directed to a unique coolant flow field configuration associated with bipolar plate assembly 8 and end plate assemblies 14 and 16.

Figure 3:
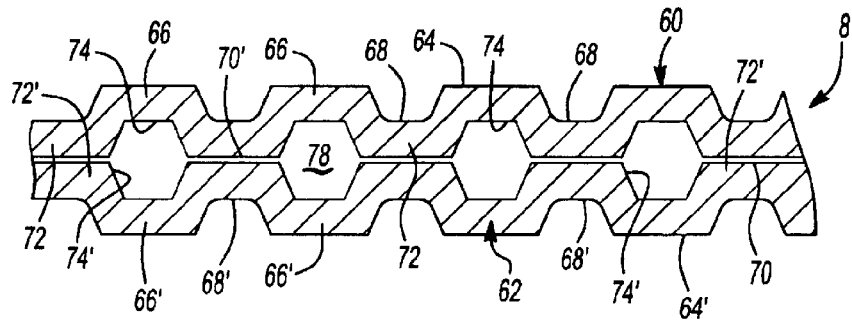
FIG. 3 is a partial sectional view of the bipolar plate assembly shown in FIG. 1.

Bipolar plate assembly 8 and end plate assemblies 14 and 16 of the present invention are liquid-cooled and provide the functions of (1) separating adjacent fuel cells of the PEM fuel cell stack 10, (2) distributing $H_2$ and air/$O_2$ to the fuel cells, (3) conducting electric current between adjacent fuel cells of the PEM fuel cell stack, and (4) cooling the PEM fuel cell stack. As shown in FIGS. 2 and 3, bipolar plate assembly 8 includes a first sub-plate 60 and a second sub-plate 62 each made from a corrosion-resistant metal sheet. First sub-plate 60 has an external face surface 64 formed to include a plurality of lands 66 defining a plurality of grooves or flow channels 68 therebetween which define an external reactant flow field. First sub-plate 60 further includes an internal face surface 70 having a plurality of lands 72 defining a plurality of grooves or flow channels 74 which define an internal coolant flow field.

Preferably, second sub-plate 62 is a mirror-image of first sub-plate 60 such that its external face surface 64' includes lands 66' defining a series if flow channels 68' which define an external reactant flow field. An internal face surface 70' of second sub-plate 62 has a plurality of lands 72' defining a series of flow channels 74' which define a coolant flow field. Sub-plates 60 and 62 are preferably formed by stamping, photoetching (i.e., through a photolithographic mask) or any other conventional process for shaping sheet metal. However, one skilled in the art will recognize that other suitable materials and manufacturing processes may be utilized for forming sub-plates 60 and 62. In operation, and by way of example, the reactant flow field of first sub-plate 60 distributes $H_2$ through the fuel cell while the reactant flow field of second sub-plate 62 distributes air/$O_2$ through the fuel cell. Preferably, end plate assemblies 14 and 16 include an electrically-conductive plate having reactant and coolant flow fields substantially similar to those of sub-plates 60 and 62. As such, the following discussion of sub-plates 60 and 62, and their unique coolant flow field configuration, is intended to likewise cover the structure and function of the electrically-conductive plate associated with monopolar end plate assemblies 14 and 16.

Figure 4:
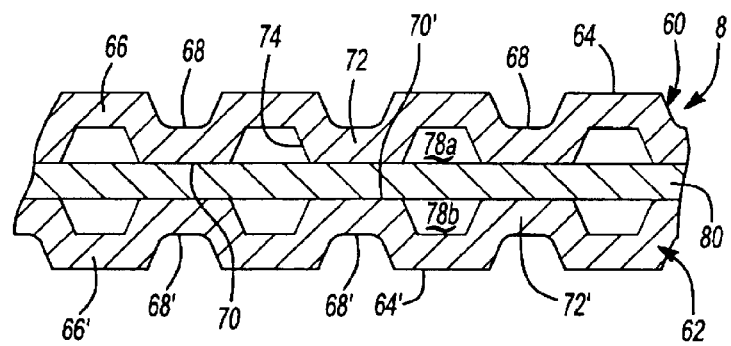
FIG. 4 is a sectional view of an alternate construction for the bipolar plate assembly which has a separator plate disposed between the conductive plates.

As best seen from FIG. 3, internal face surfaces 70 and 70' of first and second sub-plates 60 and 62 confront one another such that coolant flow channels 74 and 74' cooperate to define coolant flow passages 78 that are adapted to receive a substantially dielectric liquid coolant. Sub-plates 60 and 62 are coupled using any one of a number of joining methods known in the art, including but not limited to, brazing. It is also foreseen, however, that while sub-plates 60 and 62 may be bonded directly to one another, they could each be bonded to a discrete, intermediate metal spacer plate 80 that partitions the coolant flow passages 78 into sub-passages 78a and 78b. Spacer plate 80 may be apertured to permit some limited cross-over flow of the coolant. This partitional arrangement is best shown in FIG. 4. Each of sub-plates 60 and 62 and intermediate plate 80 may comprise titanium, or alloys thereof, but may also comprise other corrosion-resistant metals such as, but not limited to, noble metals, stainless steel, nickel, aluminum, and chromium.

As noted, the coolant flow field for second sub-plate 62 generally include a series of channels 74' and lands 70' which are oriented to define several distinct regions of varying flow resistance. These regions, as delineated by phantom lines in FIG. 5, include a supply region 82, a first diffusion region 84, a central high flow volume region 86, a pair of perimeter low flow volume regions 88A and 88B, a second diffusion region 90, and an exhaust region 92. Supply region 82 enables the coolant flow into first diffusion region 84 which, in turn, directs the coolant flow through the high flow volume regions 86 and low volume regions 88A and 88B. The coolant flowing through the high and low flow volume region 86 and 88A, 88B recollects at second diffusion region 90 and is discharged from bipolar plate assembly 8 through exhaust region 92 to the exhaust header.

Figure 6A:
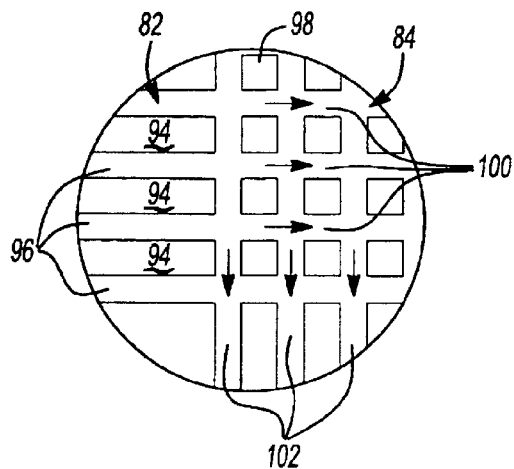
FIGS. 6A and 6B are enlarged partial plan views taken along circles A and B of FIG. 5.
Figure 7:
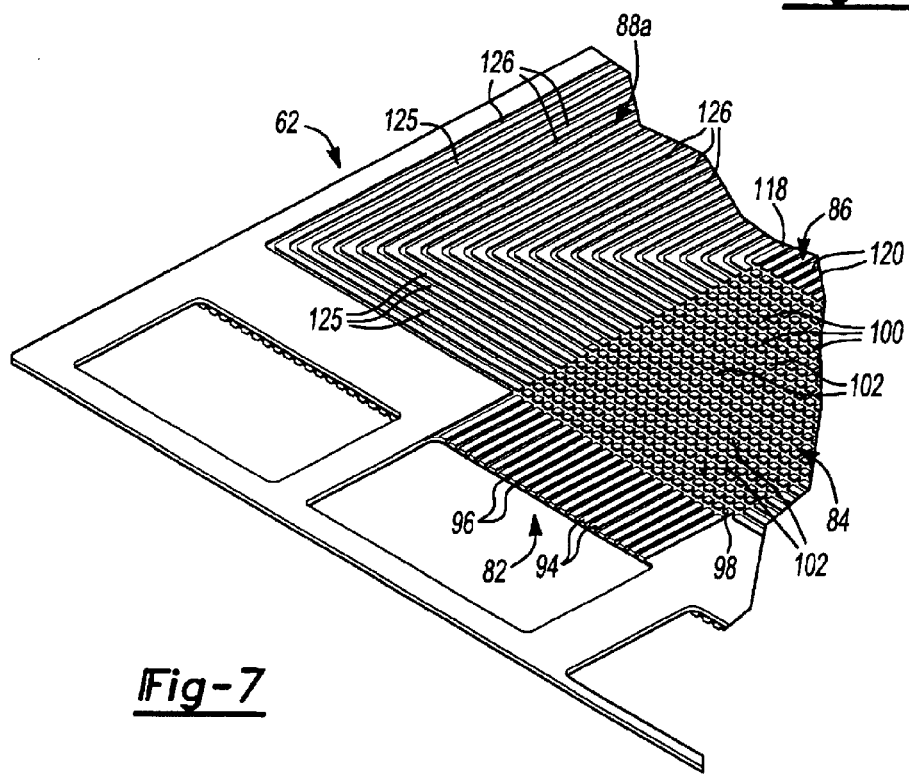
FIGS. 7 and 8 are partial isometric views of the plate element shown in FIG. 4.

As best seen from FIGS. 6A and 7, supply region 82 includes a series of straight, generally short lands 94 defining a series of parallel supply flow channels 96. First diffusion region 84 is defined by a series of square protrusions or blocks 98 that are arranged in equally-spaced columns which are aligned with entry lands 94. Thus, blocks 98 define a first series of diffuser flow channels 100 that are in axial alignment with entry flow channels 96 and a second series of diffuser flow channels 102 that are generally aligned orthogonally relative to first diffuser flow channels 100.

Figure 5:
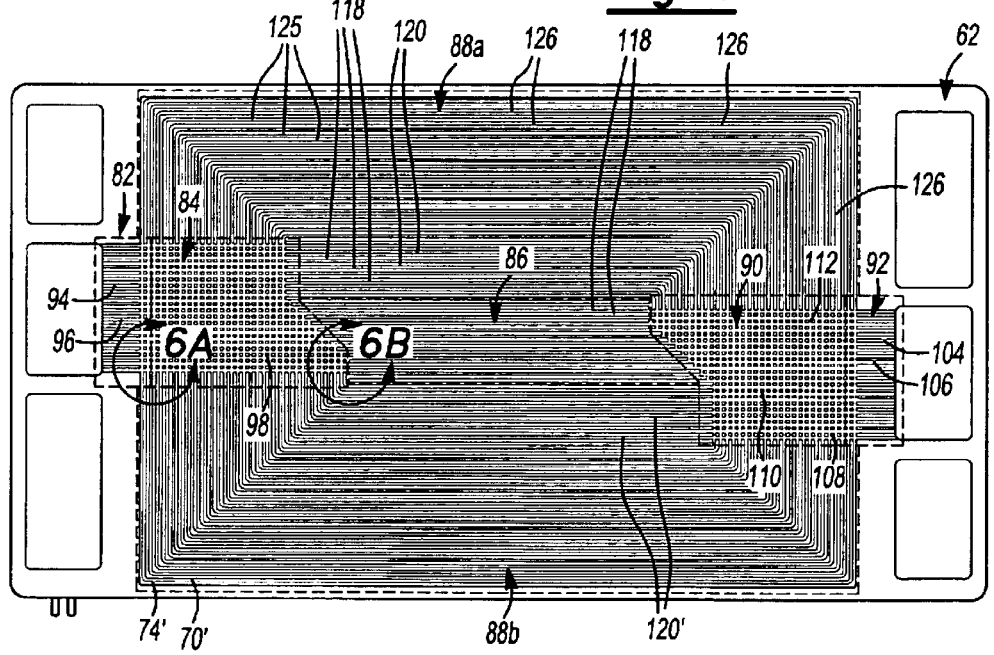
FIG. 5 is a plan view of an electrically conductive plate element associated with the bipolar plate assemblies and showing its coolant flow field configuration.
Figure 8:
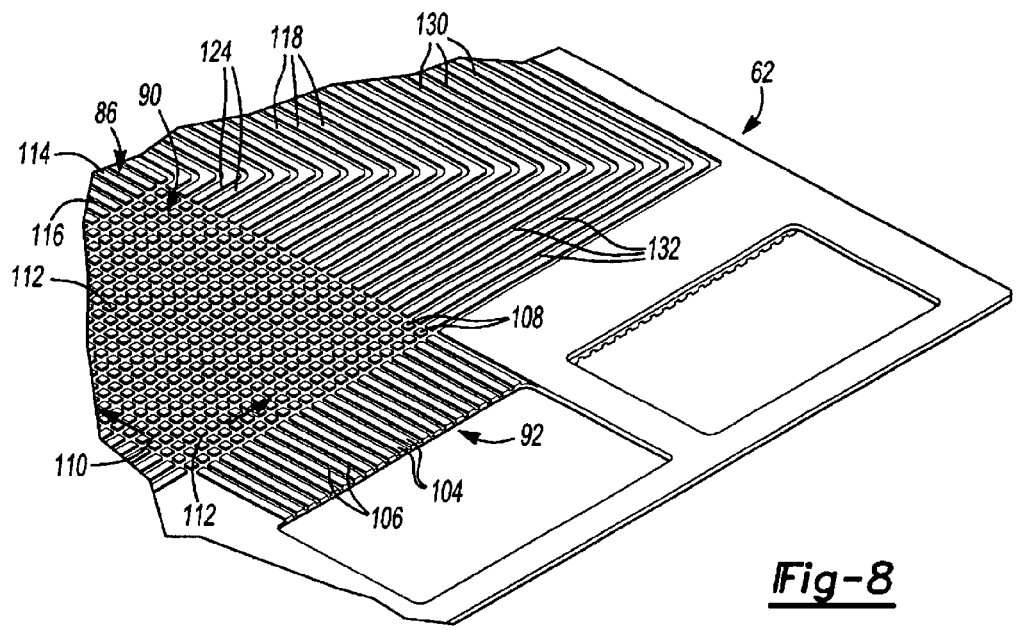

Referring primarily to FIGS. 5 and 8, exhaust region 92 is shown to be substantially similar in configuration to that of supply region 82 in that it includes a series of straight, generally short lands 104 defining a series of parallel exhaust flow channels 106. Second diffusion region 90 is defined by a series of blocks 108 that are arranged in equally-spaced columns that are aligned with exhaust lands 104. As such, blocks 108 define a first series of collector flow channels 110 that are in axial alignment with exhaust flow channels 106 and a second series of collector flow channels 112 that are generally aligned orthogonally relative to first collector flow channels 110.

Figure 6B:
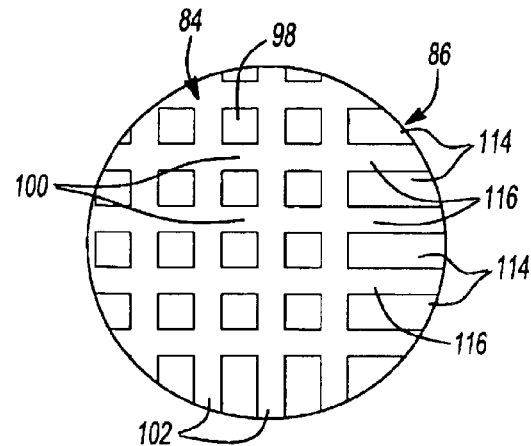

Disposed directly between first diffusion region 84 and second diffusion region 90 is high flow region 86 which includes a series of long, straight lands 114, best shown in FIG. 6B. Lands 114 are commonly aligned with entry lands 94, the columns of blocks 98 and 108 and exhausts lands 104 so as to define a series of high volume flow channels 116. Thus, a low resistance fluid flow path is established from entry channels 96 to exhaust channels 106 through diffuser flow channels 100, high volume flow channels 116 and collector channels 110.

As noted, the coolant is routed from first diffusion region 84 to second diffusion region 90 via a pair of low volume flow regions 88A and 88B. As shown in FIG. 7, region 88A has a plurality of L-shaped lands 118 defining a first series of flow channels 120. Each flow channel 120 is in fluid communication with one of first diffuser flow channels 100 and includes a transverse channel portion 124 in fluid communication with one of second collector flow channels 112. As seen, first channel portions 122 are generally parallel to flow channels 116 while second channel portions 124 are generally orthogonally oriented relative thereto. In addition, region 88A has a plurality of C-shaped lands 125 defining a second series of flow channels 126. Each flow channel 126 has a first channel portion 128 in fluid communication with one of second diffuser channels 102 (FIG. 7), a second channel portion 130 generally parallel to channel portions 122 of flow channels 120, and a third channel portion 132 in fluid communication with one of collector channels 112 (FIG. 8). Low volume flow region 88B has similar flow channels 120' and 126' with their corresponding channel portions designated by the same, yet primed, reference numerals.

Generally, high flow volume region 86 has a lower flow resistance with respect to the flow resistance of lower flow volume regions 88A and 88B. In principle, a channel having a higher flow resistance will transfer a lower volume of fluid therethrough as compared to a channel having a lower flow resistance. With respect to cooling, the greater volume of coolant that flows through a channel results in improved cooling capability. Thus, the higher flow volume region 86 provides increased cooling capability compared to the low flow volume regions 88A and 88B.

In operation, coolant enters the coolant flow field through entry channels 94 of supply region 82 and flows into the first diffusion region 84. The geometry of first diffusion region 84 (i.e. blocks 98 and perpendicular flow channels 100 and 102) results in high flow resistance therethrough. As a result, the coolant is dispersed and routed through all of the flow channels of the high and low flow volume regions 86 and 88A, 88B. The coolant flows through the channels of the high and low flow volume regions 86 and 88A, 88B and collects in second diffusion region 90 for discharge through exhaust region 92.

The pattern of coolant flow can be altered by modifying any one of several design variables. These design variables include, but are not limited to, the size, shape and pitch of the blocks 98, 108 and the flow channels in the various regions of the coolant flow field. Decreasing the pitch, increasing the obstruction size and/or decreasing the channel size all increase the flow resistance of the respective regions.

Increasing the flow resistance in the first and second diffusion regions increases the dispersion effect, enabling a higher volume of coolant to flow through the low flow volume region 88A and 88B. The effect of changing the flow resistance in the low flow volume regions 88A and 88B depends upon the relative flow resistance. If the flow resistance of the high flow volume region 86 is increased and the flow resistance of the of the low flow volume regions 88A and 88B is reduced or kept constant, a larger percentage of the total coolant flow will flow through the low flow volume regions 88A and 88B. Likewise, if the flow resistance of the high flow volume region 86 is decreased and the flow resistance of the of the low flow volume regions 88A and 88B is increased or kept constant, a smaller percentage of the total coolant flow will flow through the low flow volume regions 88A and 88B.

The relative lengths of the flow channels also effects the rate of coolant flow through each region. The greater the length of the flow channels in the low flow volume regions 88A and 88B, with respect to the length of the flow channels in the high flow volume region 86, the higher the fraction of coolant that will flow through the high flow volume region 86.

As a result of the variance in flow resistance between the high and the low flow volume regions, a higher volume of coolant is able to flow through the high flow volume region 86 than the low flow volume regions. Thus, bipolar plate assembly 8 of the present invention enables a higher cooling rate in the central area of the fuel cell stack, compared to the periphery. In this manner, a uniform temperature across the fuel cell stack can be achieved by balancing the cooling across the fuel cell stack. The achievement of a uniform temperature across the fuel cell stack enables optimization of the performance of the fuel cell stack and reduced energy required for cooling the fuel cell stack.

Figure 9:
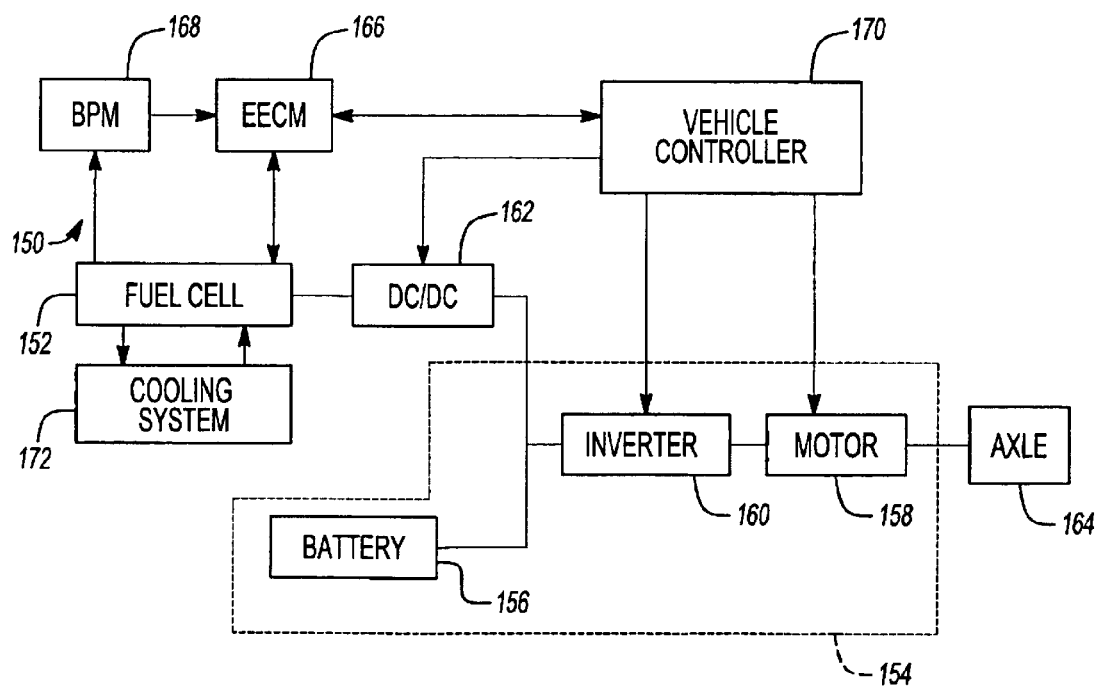
FIG. 9 is a schematic diagram of a preferred application for the fuel cell stack of the present invention.

FIG. 9 shows a preferred embodiment for a fuel cell system 150 utilizing a fuel cell stack 152, constructed as shown in FIG. 1, in conjunction with a vehicle propulsion system 154. Propulsion system 154 is shown to include a battery 156, an electric motor 158, and its associated drive electronics including an inverter 160. Inverter 160 accepts electric energy from a DC/DC converter 162 associated with fuel cell system 150, and particularly from fuel cell stack 62, and to convert the electrical energy to mechanical energy produced by motor 158. Battery 156 is constructed and arranged to accept and store electrical energy supplied by fuel cell stack 62 and to accept and store electrical energy supplied by motor 158 during regenerative braking, and to provide electric energy to motor 158. Motor 158 is coupled to a driving axle 164 to supply motive rotary power to the wheels of a vehicle (not shown). An electrochemical engine control module (EECM) 166 and a battery pack module (BPM 168) monitor various operating parameters, including, but not limited to, the voltage and current fuel cell stack 152. For example, this is done by BPM 168, or by BPM 168 and EECM 166 together, to send an output signal (message) to a vehicle controller 170 based on conditions monitored by BPM 168. Vehicle controller 170 controls actuation of electric motor 158, the drive electronics including inverter 160, DC/DC converter 162, and requests a power level from EECM 66. As mentioned, fuel cell system 150 further includes a closed-loop recirculatory cooling system 172.

Controller 170 may comprise any suitable microprocessor, microcontroller, personal computer, etc., which has central processing unit capable of executing a control program and data stored in a memory. When activated, controller 170 carries out a series of operations stored in an instruction-by instruction format in memory for providing engine control, diagnostic and maintenance operations. Controller 170 may be a dedicated controller specific to the present invention or implemented in software stored in the main vehicle electronic control module. Further, although software based control programs are usable for controlling system components in various modes of operation as described above, it will also be understood that the control can also be implemented in part or whole by dedicated electronic circuitry.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A plate assembly for channeling coolant through a PEM fuel cell, comprising:

first and second plates interconnected to define a coolant flow path therebetween, said first plate having a first surface with a coolant flow field formed therein, said coolant flow field comprising;

a first diffusion region;

a second diffusion region;

a first flow volume region interconnecting said first and second diffusion regions for providing fluid communication therebetween, said first flow volume region including a plurality of straight channels leading directly from said first diffusion region to said second diffusion region; and a second flow volume region interconnecting said first and second diffusion regions for providing fluid communication therebetween, said second flow volume region including a plurality of channels each including at least one angled transition section;

wherein the volume of coolant flowing through said first flow volume region differs from the volume of coolant flowing through said second flow volume region so as to provide a variance in cooling rate across said first plate.

2. The plate assembly of claim 1 further comprising an entrance region for providing fluid communication between a supply header and said first diffusion region.

3. The plate assembly of claim 1 further comprising an exhaust region for providing fluid communication between an exhaust header and said second diffusion region.

4. The plate assembly of claim 1 wherein said first diffusion region comprises a first plurality of flow channels intersecting through a second plurality of flow channels.

5. The plate assembly of claim 4 wherein said first and second pluralities of flow channels are perpendicular to one another.

6. The plate assembly of claim 1 wherein said second diffusion region comprises a first plurality of flow channels intersecting through a second plurality of flow channels.

7. The plate assembly of claim 6 wherein said first and second pluralities of flow channels are perpendicular to one another.

8. The plate assembly of claim 1 wherein said first flow volume region is a higher flow volume region than said second flow volume region.

9. The plate assembly of claim 1 wherein said first flow volume region comprises a plurality of channels disposed central to said first plate.

10. The plate assembly of claim 1 wherein said second flow volume region comprises a plurality of channels disposed peripherally about said first plate.

11. The plate assembly of claim 1 wherein said first plate further comprises a second surface having a reactant flow field formed therein.

12. The plate assembly of claim 1 wherein said second plate has a first surface with a second fluid flow field formed therein, said first surface of said second plate disposed adjacent to said first surface of said first plate, and wherein said second coolant flow field comprises:
   a third diffusion region;
   a fourth diffusion region;
   a third flow volume region interconnecting said third and fourth diffusion regions for providing fluid communication therebetween; and
   a fourth flow volume region interconnecting said third and fourth diffusion regions for providing fluid communication therebetween;
   wherein the volume of coolant flowing through said third flow volume region varies from the volume of coolant flowing through said fourth flow volume region, thereby providing a variance in cool rate across said second sub-plate.

13. The plate assembly of claim 12 further comprising an intermediate plate disposed between said first and second plates.

14. The plate assembly of claim 12 wherein said second plate further comprises a second surface having a reactant flow field formed therein.

15. A PEM fuel cell, comprising:
   a bipolar plate assembly having an internal coolant flow field comprising an entry diffusion region, an exhaust diffusion region, a first flow volume region interconnecting said entry and exhaust diffusion regions for providing fluid communication therebetween, and a second flow volume region interconnecting said entry and exhaust diffusion regions for providing fluid communication therebetween, said first flow volume region including a plurality of straight channels leading directly from said entry and exhaust diffusion regions and said second flow volume region including a plurality of channels each including at least one angled transition section; and
   a source of liquid coolant delivered to said entry diffusion region of said bipolar plate assembly;
   wherein the volume of said coolant flowing through said first flow volume region varies from the volume of said coolant flowing through said second flow volume region so as to provide a variance in a cooling rate across said bipolar plate assembly.

16. The PEM fuel cell of claim 15 wherein said bipolar plate assembly further comprises an entrance region for providing fluid communication between said coolant source and said entry diffusion region.

17. The PEM fuel cell of claim 15 wherein said bipolar plate assembly further comprises an exhaust region for providing fluid communication between said coolant source and said exhaust diffusion region.

18. The PEM fuel cell of claim 15 wherein said entry diffusion region comprises a first plurality of flow channels intersecting through a second plurality of flow channels.

19. The PEM fuel cell of claim 18 wherein said first and second pluralities of flow channels are perpendicular to one another.

20. The PEM fuel cell of claim 15 wherein said exhaust diffusion region comprises a first plurality of flow channels intersecting through a second plurality of flow channels.

21. The PEM fuel cell of claim 20 wherein said first and second pluralities of flow channels are perpendicular to one another.

22. The PEM fuel cell of claim 15 wherein said first flow volume region is a higher flow volume region than said second flow volume region.

23. The PEM fuel cell of claim 15 wherein said first flow volume region comprises a plurality of channels disposed central to said bipolar plate assembly.

24. The PEM fuel cell of claim 15 wherein said second flow volume region comprises a plurality of channels disposed peripherally about said bipolar plate assembly.

25. The PEM fuel cell of claim 15 wherein said bipolar plate assembly defines an external flow field over which a reactant gas flows.

* * * * *